(12) United States Patent
Ratilainen et al.

(10) Patent No.: US 12,335,046 B2
(45) Date of Patent: Jun. 17, 2025

(54) HARQ RTT TIMER ADJUSTMENT FOR MULTI-TB SCHEDULING

(71) Applicant: Telefonaktiebolaget LM Ericsson (publ), Stockholm (SE)

(72) Inventors: Antti Ratilainen, Espoo (FI); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/529,408

(22) Filed: Dec. 5, 2023

(65) Prior Publication Data

US 2024/0106574 A1 Mar. 28, 2024

Related U.S. Application Data

(63) Continuation of application No. 17/774,817, filed as application No. PCT/EP2020/081042 on Nov. 5, 2020, now Pat. No. 11,888,622.

(60) Provisional application No. 62/932,222, filed on Nov. 7, 2019.

(51) Int. Cl.
*H04L 1/1812* (2023.01)
*H04L 1/1829* (2023.01)
*H04L 47/283* (2022.01)
*H04W 4/70* (2018.01)
*H04W 72/23* (2023.01)

(52) U.S. Cl.
CPC .......... *H04L 1/1812* (2013.01); *H04L 1/1848* (2013.01); *H04L 1/1851* (2013.01); *H04L 1/1854* (2013.01); *H04L 47/283* (2013.01); *H04W 4/70* (2018.02); *H04W 72/23* (2023.01)

(58) Field of Classification Search
CPC ... H04L 1/1812; H04L 1/1854; H04L 1/1848; H04L 1/1851; H04L 47/283; H04W 4/70; H04W 72/23
USPC ......... 714/712, 748, 749, 750; 370/280, 321
See application file for complete search history.

(56) References Cited

U.S. PATENT DOCUMENTS

| | | | |
|---|---|---|---|
| 10,362,626 B2 * | 7/2019 | Tseng | H04L 1/1883 |
| 11,233,606 B2 * | 1/2022 | Babaei | H04L 1/1883 |
| 11,239,956 B2 * | 2/2022 | Babaei | H04L 1/1812 |
| 11,888,622 B2 * | 1/2024 | Ratilainen | H04W 4/70 |
| 2018/0049272 A1 * | 2/2018 | Bagheri | H04W 76/28 |
| 2018/0375623 A1 | 12/2018 | Suzuki et al. | |
| 2019/0052413 A1 * | 2/2019 | Babaei | H04L 1/1887 |
| 2019/0052416 A1 * | 2/2019 | Babaei | H04L 1/188 |
| 2020/0245395 A1 * | 7/2020 | Zhang | H04W 76/19 |
| 2020/0314948 A1 * | 10/2020 | Babaei | H04W 76/28 |
| 2022/0007455 A1 * | 1/2022 | Hong | H04W 76/28 |

(Continued)

OTHER PUBLICATIONS

PCT /E P2020/081 042 Written Opinion, Feb. 17, 2021, EPO, pp. 1-7. (Year: 2021).*

(Continued)

*Primary Examiner* — John J Tabone, Jr.
(74) *Attorney, Agent, or Firm* — Murphy, Bilak & Homiller, PLLC

(57) ABSTRACT

Provided is a method of operating a wireless device in a communication network. Operations corresponding to the method include receiving a scheduling message that includes a schedule identifying multiple transmission blocks, TB s. Operations further include dynamically generating an acknowledgement timer value that corresponds to the TBs.

26 Claims, 15 Drawing Sheets

(56) References Cited

U.S. PATENT DOCUMENTS

| | | | |
|---|---|---|---|
| 2022/0393800 A1* | 12/2022 | Ratilainen | H04W 72/23 |
| 2023/0054066 A1* | 2/2023 | Ratilainen | H04L 1/1854 |
| 2023/0209465 A1* | 6/2023 | Zhou | H04W 72/232 |
| | | | 370/311 |
| 2024/0106574 A1* | 3/2024 | Ratilainen | H04L 47/283 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 1-962.

Asustek, "DRXtimer operation in multi-TB scheduling", 3GPP TSG RAN WG2 Meeting #107bis, R2-1913773, Revision of R2-1911229, Chongqing, China, Oct. 14-18, 2019, 1-4.

Document Rapporteur (Blackberry), "RAN2 agreements for Rel-16 additional enhancements for NB-IoT and MTC", 3GPP TSG-RAN WG2 Meeting #107bis, R2-1914102, Chongqing, China, Oct. 14-18, 2019, 1-30.

Ericsson, "Revised WID: Additional MTC enhancements for LTE", 3GPP TSG RAN Meeting #84, RP-191356, (revision of RP-190770), Newport Beach, USA, Jun. 3-6, 2019, 1-5.

Ericsson, "Scheduling enhancements for LTE-MTC and NB-IoT", 3GPP TSG-RAN WG2 #107bis, R2-1913113, Revision of R2-1910426, Chongqing, China, Oct. 14-18, 2019, 1-12.

Futurewei, 3GPP TSG RAN meeting #85, RP-192313, (revision of RP-191867), Newport Beach, USA, Sep. 16-20, 2019, 1-5.

Huawei, et al., "DRX timers in multiple TBs scheduling of NB-IoT", 3GPP TSG-RAN WG2 Meeting #107bis, R2-1912612, Revision of R2-1910179, Chongqing, China, Oct. 14-18, 2019, 1-11.

Qualcomm Incorporated, "Scheduling of multiple DUUL transport blocks", 3GPP TSG RAN WG1 Meeting #98b, R1-1910718, Chongqing, China, Oct. 14-20, 2019, 1-17.

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0, Sep. 2019, pp. 1-134.

Wi Rapporteur (Ericsson), "RAN1 agreements for Rel-16 Additional MTC Enhancements for LTE", 3GPP TSG-RAN WG1 Meeting #98bis R1-1911573, Chongqing, China, Oct. 14-20, 2019, 1-47.

Wi Rapporteur (Futurewei), "RAN1 agreements for Rel-16 Additional Enhancements for NBIoT", 3GPP TSG-RAN WG1 Meeting #98bis, R1-1911575, Chongqing, China, Oct. 14-20, 2019, 1-29.

ZTE, "Summary on Multiple TB scheduling enhancement for NB-IoT", 3GPP TSG-RAN WG1 Meeting #96bis, R1-1905573, Xi'an, China, Apr. 8-12, 2019, 1-13.

3GPP, "3GPP TS 36.321 V15.3.0", 3rd Generation Partnership Project; Technical Specification Group Radio Access Network; Evolved Universal Terrestrial Radio Access (E-UTRA); Medium Access Control (MAC) protocol specification (Release 15), Sep. 2018, 1-127.

* cited by examiner

Wireless Device UE Operations

Core Network (CN) Node
Operations

HARQ RTT TIMER ADJUSTMENT FOR MULTI-TB SCHEDULING

RELATED APPLICATIONS

This application is a continuation of U.S. application Ser. No. 17/774,817, filed May 5, 2022, which was the National Stage of International Application No. PCT/EP2020/081042, filed Nov. 5, 2020, which claims the benefit of U.S. Provisional Application No. 62/932,222, filed Nov. 7, 2019, the disclosure of each of which is incorporated herein by reference.

TECHNICAL FIELD

The present disclosure relates generally to communications, and more particularly to communication methods and related devices and nodes supporting wireless communications.

BACKGROUND

A simplified wireless communication system is illustrated in FIG. 1. The system includes a UE 100 that communicates with one or more access nodes 210, 220 using radio connections 107, 108. The access nodes 210, 220 are connected to a core network node 106. The access nodes 210-220 are part of a radio access network 105.

Current solutions do not address the case when one Downlink Control information, DCI schedules multiple Transmission Blocks, TBs, for a UE. Thus, (uplink/downlink) Hybrid Automatic Repeat Request, HARQ, Round Trip Time, RTT, timer values may be too short for multiple TB transmissions, and may run out before all HARQ Acknowledgments, ACKs, have been transmitted fully. When HARQ RTT timer runs out, retransmission timer is started, during which UE monitors for retransmissions, and in particular for uplink (UL) grants for retransmissions. However, since the UE may not have been able to transmit all HARQ ACKs during a HARQ RTT timer, the UE may be listening for retransmissions, and in particular for UL grants for retransmissions, in vain, thus wasting power.

SUMMARY

It may be an object of the present disclosure to provide measures which may enable the UE to listen for (UL grants) for retransmissions in case of multiple scheduled TBs in a power efficient way.

Some embodiments herein are directed to methods of operating a wireless device in a communication network. Methods may include receiving a scheduling message that includes a schedule identifying multiple transmission blocks, determining a quantity of the TBs that are identified in the scheduling message, and dynamically generating an acknowledgement timer value that corresponds to the TBs.

In some embodiments, dynamically generating the acknowledgement timer value includes generating an acknowledgment timer value that is a function of the quantity of the transmission blocks.

Some embodiments provide that the scheduling message includes a downlink control information, DCI. In some embodiments, dynamically generating the acknowledgement timer value includes multiplying a portion of a timer value by the quantity of TBs in the scheduling message.

In some embodiments, the acknowledgement timer value includes a Hybrid Automatic Repeat Request Round Trip Time, HARQ RTT, timer value that is generated as 7+l*N in which N is a Physical Uplink Control Channel, PUCCH, repetition factor and l is the quantity of TBs identified in the scheduling message.

In some embodiments, the acknowledgement timer value includes a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

Some embodiments provide that the scheduling message includes a first scheduling message, the TBs include first TB's, the quantity of TB's includes a first quantity of TBs, and the acknowledgement timer value includes a first acknowledgement timer value. In such embodiments, operations further include receiving a second scheduling message that includes a second schedule identifying a second set of multiple TBs, determining a second quantity of TBs that are identified in the second scheduling message, and dynamically generating a second acknowledgement timer value that corresponds to the second set of TB s and that is different from the first acknowledgement timer value.

In some embodiments, the communication network includes a narrow band internet of things network, NBIoT. Some embodiments provide that the communication network includes an enhanced Machine Type Communication, eMTC, network.

Some embodiments disclosed herein include methods of operating a radio access network node, RAN, in a communication network. Methods may include sending, to a wireless device, UE, a scheduling message that includes a schedule identifying multiple transmission blocks and that causes the UE to determine a quantity of the TBs that are identified in the scheduling message and to dynamically generate an acknowledgement timer value that corresponds to the TBs.

In some embodiments, the acknowledgement timer value is a function of the quantity of transmission blocks. In some embodiments, the scheduling message includes a downlink control information, DCI. Some embodiments provide that the acknowledgement timer value includes a product from multiplying a portion of a timer value by the quantity of TBs in the scheduling message.

In some embodiments, the acknowledgement timer value includes a Hybrid Automatic Repeat Request Round Trip Time, HARQ RTT, timer value that is generated as 7+l*N in which N is a Physical Uplink Control Channel, PUCCH, repetition factor and l is the quantity of TBs identified in the scheduling message.

In some embodiments, the acknowledgement timer value includes a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

Some embodiments provide that the scheduling message is a first scheduling message, the multiple TBs include a first plurality of TB's, the quantity of TB's includes a first quantity of TBs, and the acknowledgement timer value includes a first acknowledgement timer value. In such embodiments, the UE is further caused to receive a second scheduling message that includes a second schedule identifying a second plurality of TBs; determine a second quantity of TBs that are identified in the second scheduling message, and dynamically generate a second acknowledgement timer value that corresponds to the second plurality of TBs and that is different from the first acknowledgement timer value.

In some embodiments, the communication network includes a narrow band internet of things network, NBIoT. Some embodiments provide that the communication network includes an enhanced Machine Type Communication, eMTC, network.

Some embodiments are directed to methods of operating a core network node in a communication network. Methods may include sending, to a UE, a scheduling message that includes a schedule identifying multiple transmission blocks and that causes the UE to determine a quantity of the TBs that are identified in the scheduling message and to dynamically generate an acknowledgement timer value that corresponds to the TBs.

In some embodiments, the acknowledgement timer value is a function of the quantity of transmission blocks. In some embodiments, the scheduling message includes a downlink control information, DCI. Some embodiments provide that the acknowledgement timer value includes a product from multiplying a portion of a timer value by the quantity of TBs in the scheduling message.

In some embodiments, the acknowledgement timer value includes a Hybrid Automatic Repeat Request Round Trip Time, HARQ RTT, timer value that is generated as 7+l*N in which N is a Physical Uplink Control Channel, PUCCH, repetition factor and l is the quantity of TBs identified in the scheduling message.

In some embodiments, the acknowledgement timer value includes a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

Some embodiments provide that the scheduling message is a first scheduling message, the multiple TBs include a first plurality of TB's, the quantity of TB's includes a first quantity of TBs, and the acknowledgement timer value includes a first acknowledgement timer value. In such embodiments, the UE is further caused to receive a second scheduling message that includes a second schedule identifying a second plurality of TBs; determine a second quantity of TBs that are identified in the second scheduling message, and dynamically generate a second acknowledgement timer value that corresponds to the second plurality of TBs and that is different from the first acknowledgement timer value.

In some embodiments, the communication network includes a narrow band internet of things network, NBIoT. Some embodiments provide that the communication network includes an enhanced Machine Type Communication, eMTC, network.

In some embodiments, a wireless device includes processing circuitry and memory coupled with the processing circuitry. The memory includes instructions that when executed by the processing circuitry causes the wireless device to perform operations disclosed herein.

Some embodiments are directed to a wireless device that is adapted to perform operations according to any methods disclosed herein.

Some embodiments are directed to a computer program comprising program code to be executed by processing circuitry of a wireless device. Execution of the program code causes the wireless device to perform any operations disclosed herein.

Some embodiments are directed to a computer program product comprising a non-transitory storage medium including program code to be executed by processing circuitry of a wireless device. Execution of the program code causes the wireless device to perform any operations disclosed herein.

According to embodiments disclosed herein, by dynamically generating an acknowledgement timer value based on the quantity of transmission blocks in a DCI, efficiencies in power consumption and/or performance may be realized.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As provided herein, the UE (eMTC) may listen for (UL grants) for retransmissions in case of multiple scheduled TBs. In some embodiments, the UE may listen on the machine type communication physical downlink control channel, MPDCCH. In some embodiments, for asynchronous adaptive HARQ, HARQ feedback signal is not sent, except for BL UEs and UEs in enhanced coverage. The UE may follow what the PDCCH, MPDCCH and/or SPDCCH asks the UE to do. Examples include performing a transmission or a retransmission, among others. For BL UEs or UEs in enhanced coverage, a downlink ACK response to uplink (re)transmissions may be sent in the DCI with C-RNTI or SPS C-RNTI scheduling MPDCCH.

Figure 1:
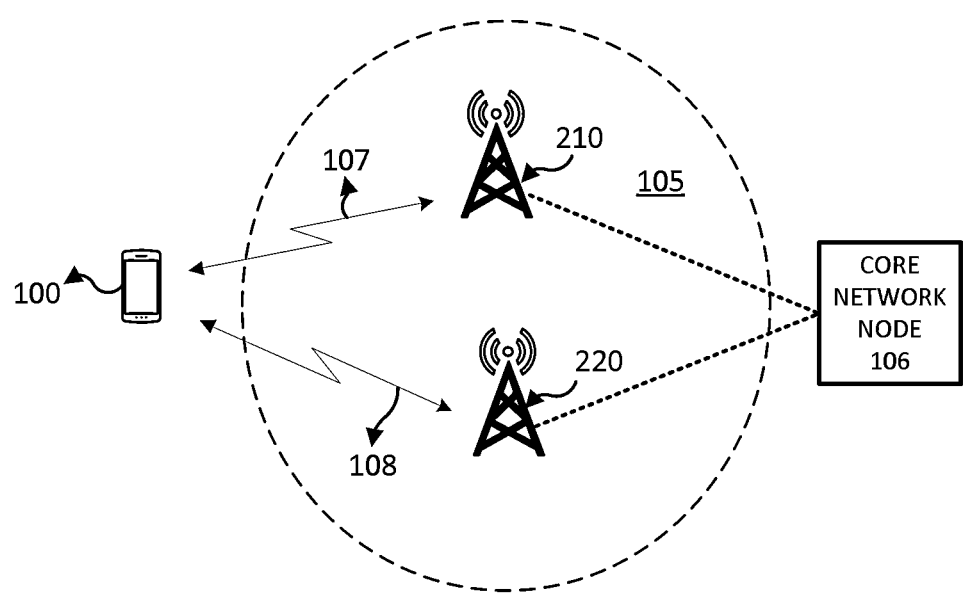
FIG. 1 illustrates a wireless communication system.
Figure 2:
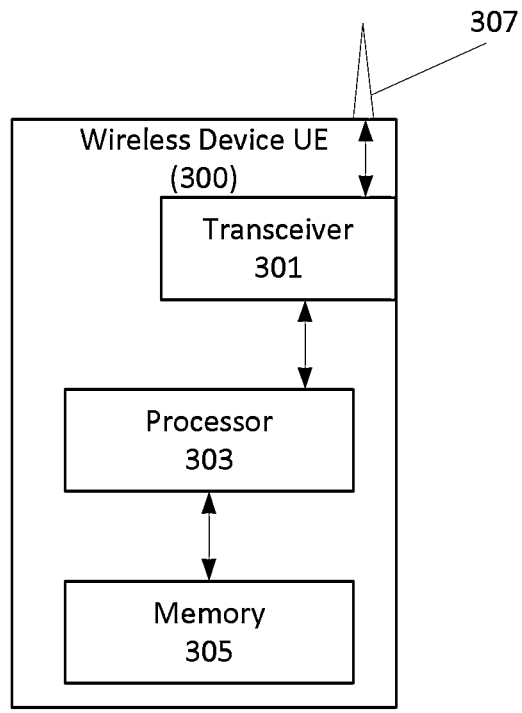
FIG. 2 is a block diagram illustrating a wireless device UE according to some embodiments of inventive concepts.

FIG. 2 is a block diagram illustrating elements of a wireless device UE 300 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device 4110 of FIG. 8, UE 4200 of FIG. 9, UEs 4491 of FIG. 11, and/or UE 4530 of FIG. 12.) As shown, wireless device UE may include an antenna 307 (e.g., corresponding to antenna 4111 of FIG. 8), and transceiver circuitry 301 (also referred to as a transceiver, e.g., corresponding to interface 4114 of FIG. 8) including a transmitter and a receiver configured to provide uplink and downlink radio communications with a base station(s) (e.g., corresponding to network node 4160 of FIG. 8, also referred to as a RAN node) of a radio access network. Wireless device UE may also include processing circuitry 303 (also referred to as a processor, e.g., corresponding to processing circuitry 4120 of FIG. 8) coupled to the transceiver circuitry, and memory circuitry 305 (also referred to as memory, e.g., corresponding to device readable medium 4130 of FIG. 8) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 3:
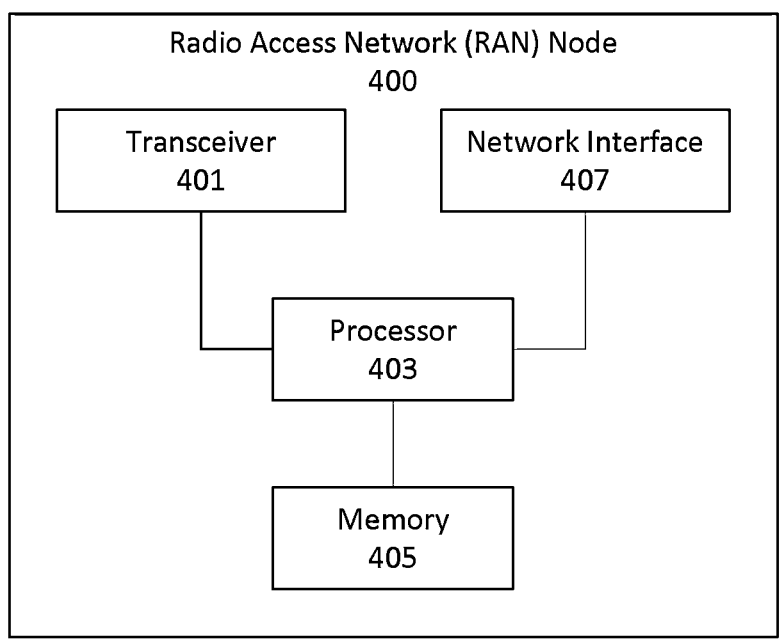
FIG. 3 is a block diagram illustrating a radio access network RAN node (e.g., a base station eNB/gNB) according to some embodiments of inventive concepts.

FIG. 3 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 8, base stations 4412a, 4412b, 4412c of FIG. 11 and/or base station 4520 of FIG. 12.) As shown, the RAN node may include transceiver circuitry 401 (also referred to as a transceiver, e.g., corresponding to portions of interface 4190 of FIG. 8) including a transmitter and a receiver configured to provide uplink and downlink radio communications with mobile terminals. The RAN node may include network interface circuitry 407 (also referred to as a network interface, e.g., corresponding to portions of interface 4190 of FIG. 8) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 8) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 4:
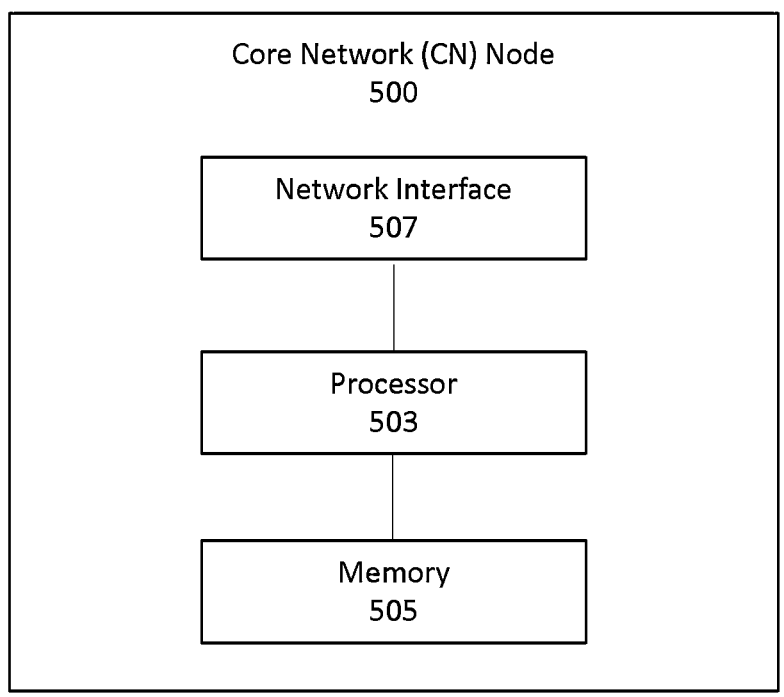
FIG. 4 is a block diagram illustrating a core network CN node (e.g., an AMF node, an SMF node, etc.) according to some embodiments of inventive concepts.

FIG. 4 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes).

When the feature of scheduling multiple TBs with one DCI is used, varying number of TBs may be scheduled with each DCI. For example, in some embodiments, the maximum amount of TBs scheduled with a single DCI can be 8 TBs both in uplink and downlink for CE Mode A, and 4 TBs both in uplink and downlink for CE Mode B.

Some embodiments may configure a HARQ RTT timer according to the maximum number of scheduled TBs. However, successive DCIs may schedule different amounts of TBs. For example, a first DCI may schedule 8 TBs and the following DCI may schedule 4 TBs. Thus, static value for HARQ RTT Timer may be limiting as it may either be too long for the 4 TBs if configured according to the maximum value (8). This may result in the UE wasting time and power while idle for the remaining duration of the timer. In some embodiments, the timer may need to be reconfigured for every DCI separately, which may waste UE power and resources as the UE may need to be reconfigured frequently.

According to some embodiments, HARQ RTT timers may be extended dynamically by multiplying at least a portion of the timer value by the number of scheduled TBs by one DCI. According to such embodiments, the UE may dynamically adapt to the varying number of scheduled TBs by adjusting the HARQ RTT timer dynamically.

When scheduling multiple TBs with one DCI, a varying number of TBs may be scheduled with each DCI.

According to some embodiments herein, the UE may apply a multiplier (e.g., denoted as l) to at least a portion of the (UL) HARQ RTT timer. In some embodiments, this multiplier, may be equivalent to the number of TBs scheduled by the latest DCI. In some embodiments, the information to UE MAC layer, where the timer is started and used, may be defined in the lower layers according to the information conveyed in the DCI. In this manner, the UE may be able to dynamically adjust the HARQ RTT timer according to the number of TBs scheduled by each DCI.

In some embodiments, a different mechanism may be used depending on whether the UE is full-duplex (FD) or half-duplex (HD) FDD UE. For FD, it may be possible to start monitoring earlier and the legacy timer values may be sufficient. For HD, an extension of the monitoring according to the multiplier 1 may be specified. Some embodiments provide that whether UE should follow FD of HD behavior may be indicated in the DCI, and/or the eNB and UE may act according to the UE capability. For example, the approach may be determined based on whether the UE is FD or HD.

Some embodiments provide that for BL UEs and UEs in enhanced coverage, HARQ RTT Timer may correspond to 7+N where N is the used PUCCH repetition factor, where only valid (configured) UL subframes as configured by upper layers in fdd-UplinkSubframeBitmapBR are counted. In case of TDD, HARQ RTT Timer may correspond to 3+k+N, where k is the interval between the last repetition of downlink transmission and the first repetition of the transmission of associated HARQ feedback, and N is the used PUCCH repetition factor, where only valid UL subframes are counted.

In some embodiments, the UE may apply the multiplier 1 to the HARQ RTT Timer value. For BL UEs and UEs in enhanced coverage, when the feature of scheduling multiple TBs with a single DCI is used, HARQ RTT Timer may be dynamically adjusted as a function of the number of TBs scheduled in a given DCI. For example, the HARQ RTT Timer value may be determined as 7+l*N where N is the PUCCH repetition factor, where only valid (configured) UL subframes as configured by upper layers in fdd-UplinkSubframeBitmapBR are counted, and where l is the number of TBs scheduled by the corresponding DCI.

In some embodiments, the scheduling delay (i.e. 7 above) may be adjusted according to the delay from UE and eNB processing times. For example, the scheduling delay may be increased if more processing time is needed or reduced if less time is sufficient. Some embodiments provide that a fixed value may be captured in specifications.

In some embodiments, additional delay s on top of 7+l*N may be accounted for if needed for alignment with future MPDCCH opportunities. For example, the total timer length may be 7+l*N+s.

Figure 5:
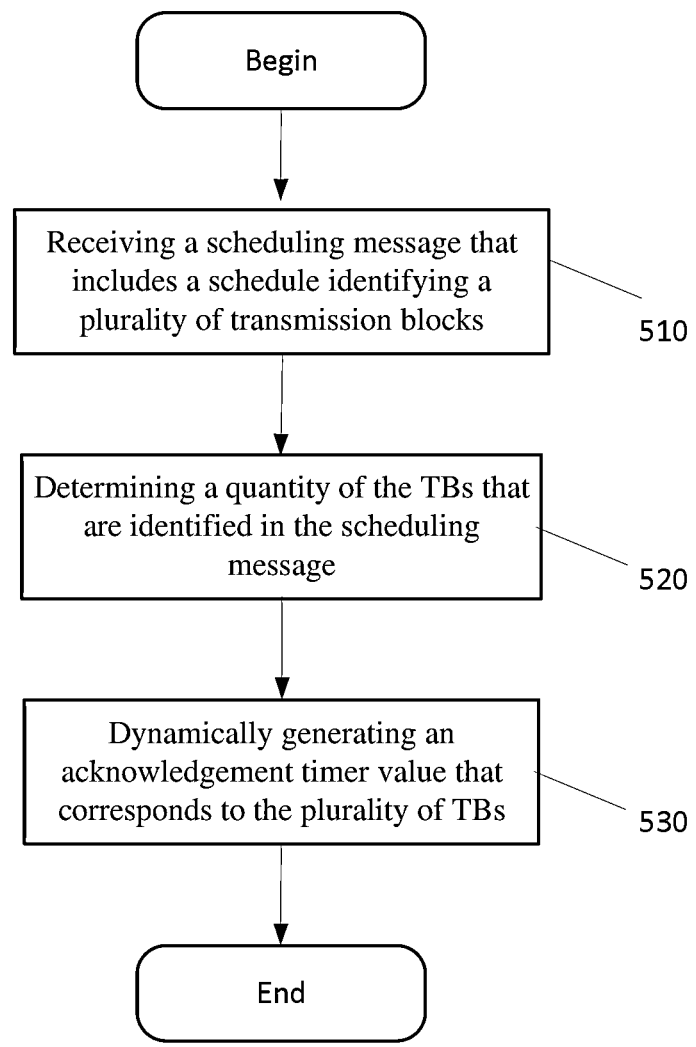
FIG. 5 is a flow chart illustrating operations of a wireless device according to some embodiments of inventive concepts.

Operations of the wireless device 300 (implemented using the structure of the block diagram of FIG. 2) will now be discussed with reference to the flow chart of FIG. 5 according to some embodiments of inventive concepts. For example, modules may be stored in memory 305 of FIG. 2, and these modules may provide instructions so that when the instructions of a module are executed by respective wireless device processing circuitry 303, processing circuitry 303 performs respective operations of the flow chart. Methods according to some embodiments include receiving 510 a scheduling message that includes a schedule identifying multiple TBs. Operations include determining 520 a quantity of the TBs that are identified in the scheduling message and dynamically generating 530 an acknowledgement timer value that corresponds to the plurality of TBs.

In some embodiments, dynamically generating the acknowledgement timer value includes generating an acknowledgment timer value that is a function of the quantity of the TBs. Some embodiments provide that the scheduling message includes a downlink control information, DCI. In some embodiments, dynamically generating the acknowledgement timer value includes multiplying a portion of a timer value by the quantity of the TBs in the scheduling message.

In some embodiments, the acknowledgement timer value includes a Hybrid Automatic Repeat Request Round Trip Time, HARQ RTT, timer value that is generated as 7+l*N in which N is a Physical Uplink Control Channel, PUCCH, repetition factor and l is the quantity of the TB s identified in the scheduling message.

Some embodiments provide that the acknowledgement timer value includes a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

Some embodiments provide that the scheduling message includes a first scheduling message, the TBs comprises first TB's, the quantity of the TB's is a first quantity of TBs, and the acknowledgement timer value is a first acknowledgement timer value. Since the acknowledgement timer value may be determined dynamically here, another scheduling message with a different number of TB s scheduled therein may cause a different acknowledgement timer value to be generated.

In some embodiments, the communication network includes a narrow band internet of things network, NBIoT.

Some embodiments provide that the communication network includes an enhanced Machine Type Communication, eMTC, network.

Some embodiments provide that an eMTC UE may correspond to a bandwidth limited, BL, UE and/or a UE using enhanced coverage functionality. In some embodiments, BL UEs may be Cat-M1 and/or Cat-M2 UEs. In some embodiments, the eMTC, BL UE, Cat-M and/or LTE-M may be used interchangeably herein.

Figure 6:
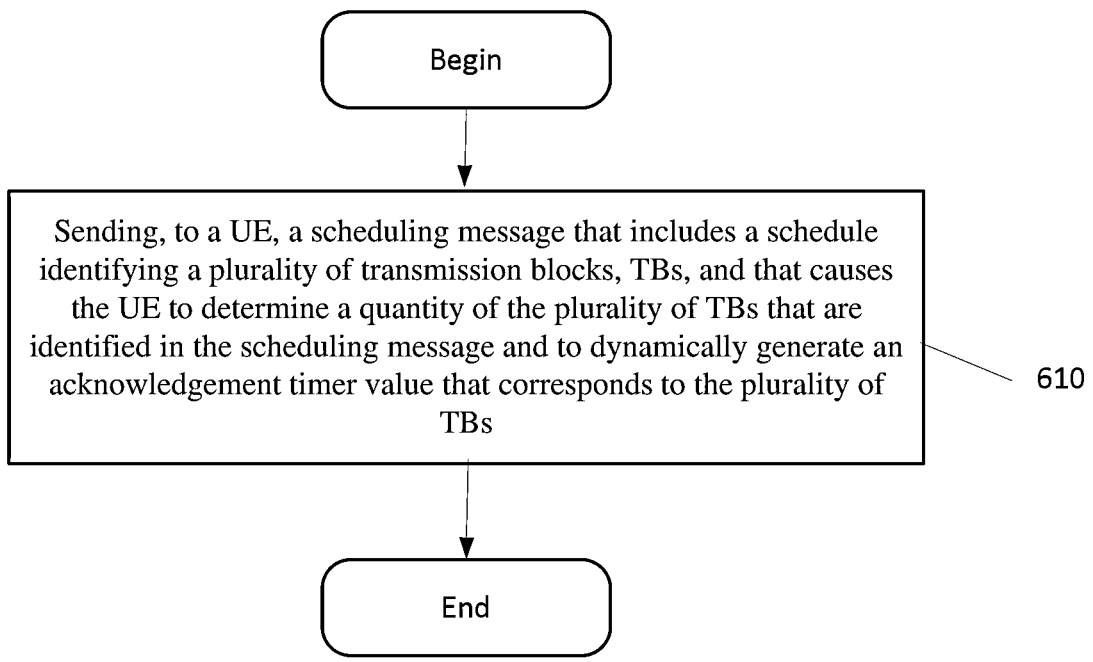
FIG. 6 is a flow chart illustrating operations of a radio access network node according to some embodiments of inventive concepts.

Operations of a RAN node 400 (implemented using the structure of FIG. 3) will now be discussed with reference to the flow chart of FIG. 6 according to some embodiments of inventive concepts. For example, modules may be stored in memory 405 of FIG. 3, and these modules may provide instructions so that when the instructions of a module are executed by respective RAN node processing circuitry 403, processing circuitry 403 performs respective operations of the flow chart.

According to some embodiments, operations may include sending 610, to a UE, a scheduling message that includes a schedule identifying multiple TBs and that causes the UE to determine a quantity of the TB s that are identified in the scheduling message and to dynamically generate an acknowledgement timer value that corresponds to the TB s.

Figure 7:
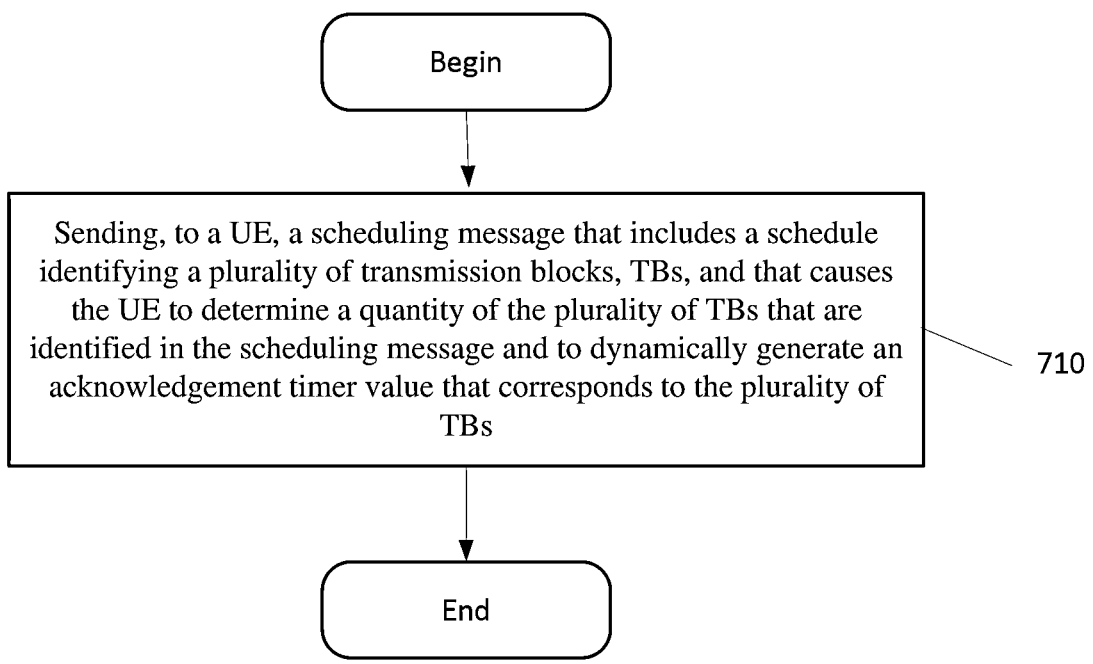
FIG. 7 is a flow chart illustrating operations of a core network node according to some embodiments of inventive concepts.

Network CN node 500 (implemented using the structure of FIG. 4) will now be discussed with reference to the flow chart of FIG. 7 according to some embodiments of inventive concepts. For example, modules may be stored in memory 505 of FIG. 4, and these modules may provide instructions so that when the instructions of a module are executed by respective CN node processing circuitry 503, processing circuitry 503 performs respective operations of the flow chart.

According to some embodiments, operations may include sending 610, to a UE, a scheduling message that includes a schedule identifying multiple TBs and that causes the UE to determine a quantity of the TB s that are identified in the scheduling message and to dynamically generate an acknowledgement timer value that corresponds to the TB s.

Example embodiments are discussed below.

1. A method of operating a wireless device in a communication network, the method comprising:
   receiving a scheduling message that includes a schedule identifying a plurality of transmission blocks, TBs;
   determining a quantity of the plurality of TB s that are identified in the scheduling message; and
   dynamically generating an acknowledgement timer value that corresponds to the plurality of TBs.

2. The method of embodiment 1, wherein dynamically generating the acknowledgement timer value comprises generating an acknowledgment timer value that is a function of the quantity of the plurality of transmission blocks.

3. The method of any of embodiments 1 and 2, wherein the scheduling message comprises a downlink control indication, DCI.

4. The method of any of embodiments 1-3, wherein dynamically generating the acknowledgement timer value comprises multiplying a portion of a timer value by the quantity of the plurality of TBs in the scheduling message.

5. The method of any of embodiments 1-4, wherein the acknowledgement timer value comprises a Hybrid Automatic Repeat Request Round Trip Time, HARQ RTT, timer value that is generated as 7+l*N in which N is a Physical Uplink Control Channel, PUCCH, repetition factor and l is the quantity of the plurality of TB s identified in the scheduling message.

6. The method of any of embodiments 1-5, wherein the acknowledgement timer value comprises a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

7. The method of any of embodiments 1-6, wherein the scheduling message comprises a first scheduling message,
   wherein the plurality of TBs comprises a first plurality of TB's,
   wherein the quantity of the plurality of TB's comprises a first quantity of TBs, and
   wherein the acknowledgement timer value comprises a first acknowledgement timer value,
   the method further comprising:
   receiving a second scheduling message that includes a second schedule identifying a second plurality of TBs;
   determining a second quantity of the plurality of TB s that are identified in the second scheduling message; and dynamically generating a second acknowledgement timer value that corresponds to the second plurality of TB s and that is different from the first acknowledgement timer value.

8. The method of any of embodiments 1-7, wherein the communication network comprises a narrow band internet of things network, NBIoT.

9. The method of any of embodiments 1-7, wherein the communication network comprises an enhanced Machine Type Communication, eMTC, network.

10. A wireless device (300) comprising:
processing circuitry (303); and
memory (305) coupled with the processing circuitry, wherein the memory includes instructions that when executed by the processing circuitry causes the wireless device to perform operations according to any of Embodiments 1-9.

12. A wireless device (300) adapted to perform according to any of Embodiments 1-9.

13. A computer program comprising program code to be executed by processing circuitry (303) of a wireless device (300), whereby execution of the program code causes the wireless device (300) to perform operations according to any of embodiments 1-9.

14. A computer program product comprising a non-transitory storage medium including program code to be executed by processing circuitry (303) of a wireless device (300), whereby execution of the program code causes the wireless device (300) to perform operations according to any of embodiments 1-9.

15. A method of operating a radio access network node, RAN, in a communication network, the method comprising:
sending, to a UE, a scheduling message that includes a schedule identifying a plurality of transmission blocks, TBs, and that causes the UE to determine a quantity of the plurality of TBs that are identified in the scheduling message and to dynamically generate an acknowledgement timer value that corresponds to the plurality of TBs.

16. The method of embodiment 15, wherein the acknowledgement timer value is a function of the quantity of the plurality of transmission blocks.

17. The method of any of embodiments 15 and 16, wherein the scheduling message comprises a downlink control indication, DCI.

18. The method of any of embodiments 15-17, wherein the acknowledgement timer value comprises a product from multiplying a portion of a timer value by the quantity of the plurality of TB s in the scheduling message.

19. The method of any of embodiments 15-18, wherein the acknowledgement timer value comprises a Hybrid Automatic Repeat Request Round Trip Time, HARQ RTT, timer value that is generated as 7+l*N in which N is a Physical Uplink Control Channel, PUCCH, repetition factor and l is the quantity of the plurality of TBs identified in the scheduling message.

20. The method of any of embodiments 15-19, wherein the acknowledgement timer value comprises a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

21. The method of any of embodiments 15-20, wherein the scheduling message comprises a first scheduling message,
wherein the plurality of TBs comprises a first plurality of TB's,
wherein the quantity of the plurality of TB's comprises a first quantity of TBs, and
wherein the acknowledgement timer value comprises a first acknowledgement timer value,
wherein the UE is further caused to:
receive a second scheduling message that includes a second schedule identifying a second plurality of TBs;
determine a second quantity of the plurality of TBs that are identified in the second scheduling message; and
dynamically generate a second acknowledgement timer value that corresponds to the second plurality of TB s and that is different from the first acknowledgement timer value.

22. The method of any of embodiments 15-21, wherein the communication network comprises a narrow band internet of things network, NBIoT.

23. The method of any of embodiments 15-21, wherein the communication network comprises an enhanced Machine Type Communication, eMTC, network.

24. A radio access network, RAN, node (400) comprising:
processing circuitry (403); and
memory (405) coupled with the processing circuitry, wherein the memory includes instructions that when executed by the processing circuitry causes the RAN node to perform operations according to any of Embodiments 15-23.

25. A radio access network, RAN, node (400) adapted to perform according to any of Embodiments 15-23.

26. A computer program comprising program code to be executed by processing circuitry (403) of a radio access network, RAN, node (400), whereby execution of the program code causes the RAN node (400) to perform operations according to any of embodiments 15-23.

27. A computer program product comprising a non-transitory storage medium including program code to be executed by processing circuitry (403) of a radio access network, RAN, node (400), whereby execution of the program code causes the RAN node (400) to perform operations according to any of embodiments 15-23.

28. A method of operating a core network, CN, node (500) configured to operate in a communication network, the method comprising:
sending, to a UE, a scheduling message that includes a schedule identifying a plurality of transmission blocks, TBs, and causes the UE to determine a quantity of the plurality of TBs that are identified in the scheduling message and to dynamically generate an acknowledgement timer value that corresponds to the plurality of TBs.

29. The method of embodiment 28, wherein the acknowledgement timer value is a function of the quantity of the plurality of transmission blocks.

30. The method of any of embodiments 28 and 29, wherein the scheduling message comprises a downlink control indication, DCI.

31. The method of any of embodiments 28-30, wherein the acknowledgement timer value comprises a product from multiplying a portion of a timer value by the quantity of the plurality of TB s in the scheduling message.

32. The method of any of embodiments 28-31, wherein the acknowledgement timer value comprises a Hybrid Automatic Repeat Request Round Trip Time, HARQ RTT, timer value that is generated as 7+l*N in which N is a Physical Uplink Control Channel, PUCCH, repetition factor and l is the quantity of the plurality of TBs identified in the scheduling message.

33. The method of any of embodiments 28-32, wherein the acknowledgement timer value comprises a Hybrid Automatic Repeat Request Round Trip Time, HARQ RTT, timer value that is generated as 7+l*N+s in which N is a Physical Uplink Control Channel, PUCCH, repetition factor, l is the quantity of the plurality of TBs identified in the scheduling message and s is a delay factor that provides timer alignment corresponding to machine type communication physical downlink control channel, MPDCCH, operations.

34. The method of any of embodiments 28-33, wherein the scheduling message comprises a first scheduling message,
wherein the plurality of TBs comprises a first plurality of TB's,
wherein the quantity of the plurality of TB's comprises a first quantity of TBs, and
wherein the acknowledgement timer value comprises a first acknowledgement timer value
the method further comprising:
receiving a second scheduling message that includes a second schedule identifying a second plurality of TB s;
determining a second quantity of the plurality of TB s that are identified in the second scheduling message; and
dynamically generating a second acknowledgement timer value that corresponds to the second plurality of TB s and that is different from the first acknowledgement timer value.

35. The method of any of embodiments 28-34, wherein the communication network comprises a narrow band internet of things network, NBIoT.

36. The method of any of embodiments 28-35, wherein the communication network comprises an enhanced Machine Type Communication, eMTC, network.

37. A core network, CN, node (500) comprising:
processing circuitry (503); and
memory (505) coupled with the processing circuitry, wherein the memory includes instructions that when executed by the processing circuitry causes the CN node to perform operations according to any of Embodiments 28-36.

38. A core network, CN, node (500) adapted to perform according to any of Embodiments 28-36.

39. A computer program comprising program code to be executed by processing circuitry (403) of a core network, CN, node (500), whereby execution of the program code causes the CN node (500) to perform operations according to any of embodiments 28-36.

40. A computer program product comprising a non-transitory storage medium including program code to be executed by processing circuitry (503) of a core network, CN, node (500), whereby execution of the program code causes the CN node (500) to perform operations according to any of embodiments 28-36.

Explanations are provided below for various abbreviations/acronyms used in the present disclosure.

| Abbreviation | Explanation |
| --- | --- |
| 3GPP | 3rd Generation Partnership Project |
| 5G | 5th Generation |
| 5GC | 5G Core network |
| AMF | Access and Mobility management Function |
| AS | Access Stratum |
| BRSRP | Beam level Reference Signal Received Power |
| BRSRQ | Beam level Reference Signal Received Quality |
| BSINR | Beam level Signal to Noise Ratio |
| CCO | Coverage Capacity Optimization |
| CE | Control Element |
| CBRA | Contention Based Random Access |
| CFRA | Contention Free Random Access |
| CHO | Conditional Handover |
| CN | Core Network |
| C-RNTI | Cell Radio Network Temporary Identifier |
| CSI-RS | Channel State Information Reference Signal |
| CU | Central Unit |
| dB | decibel |
| DCI | Downlink Control Information |
| DC | Dual Connectivity |
| DL | Downlink |
| DU | Distributed Unit |
| eMTC | enhanced Machine Type Communication |
| eNB | eNodeB |
| eNodeB | Evolved NodeB |
| EPC | Evolved Packet Core |
| EUTRA/E-UTRA | Evolved Universal Terrestrial Radio Access |
| EUTRAN/E-UTRAN | Evolved Universal Terrestrial Radio Access Network |
| FFS | For Further Study |
| gNB/gNodeB | A radio base station in NR. |
| GERAN | GSM/EDGE Radio Access Network |
| GNSS | Global Navigation Satellite System |
| GPRS | General Packet Radio Service |
| GTP | GPRS Tunneling Protocol |
| HARQ | Hybrid Automatic Repeat Request |
| HO | Handover |
| IE | Information Element |
| IoT | Internet of Things |
| LTE | Long Term Evolution |
| L2 | Layer 2 |
| L3 | Layer 3 |
| MAC | Medium Access Control |
| MAC CE | MAC Control Element |
| MCG | Master Cell Group |
| MDT | Minimization of drive tests |
| MME | Mobility Management Entity |
| MSG | Message |
| MRO | Mobility Robustness Optimization |
| NAS | Non-access Stratum |
| NB-IoT | Narrow Band Internet of Things |
| NG | The interface/reference point between NG-RAN and 5GC. |
| NGAP | Application Protocol/Next Generation Application Protocol |
| NG-RAN | Next Generation Radio Access Network |
| NR | New Radio |
| OAM | Operation and Management |
| PCell | Primary Cell (i.e. the primary cell of a MCG) |
| PLMN | Public Land Mobile Network |
| PSCell | Primary Secondary Cell (i.e. the primary cell of a SCG) |
| QoS | Quality of Service |
| RA | Random Access |
| RAR | Random Access Response |
| RACH | Random Access Channel |
| RAN | Radio Access Network |
| RAT | Radio Access Technology |
| RLC | Radio Link Control |
| RLF | Radio Link Failure |
| RRC | Radio Resource Control |
| RRM | Radio Resource Management |
| RS | Reference Signal |
| RSRP | Reference Signal Received Power |
| RSRQ | Reference Signal Received Quality |
| RTT | Round Trip Time |
| S1 | The interface/reference point between E-UTRAN and EPC. |
| RSSI | Received Signal Strength Indicator |

-continued

| Abbreviation | Explanation |
| --- | --- |
| SCell | Secondary Cell |
| SCG | Secondary Cell Group |
| SC-PTM | Single Cell Point to Multipoint |
| SINR | Signal to Interference and Noise Ratio |
| SpCell | Special Cell, i.e. either a PCell or a PSCell. |
| SN | Sequence Number |
| SRB | Signaling Radio Bearer |
| SSB | Synchronization Signal Block |
| TA | Timing Adjustment/Advance |
| TB | Transmission Block |
| TCE | Trace Collection Entity |
| TS | Technical Specification |
| UE | User Equipment |
| UL | Uplink |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
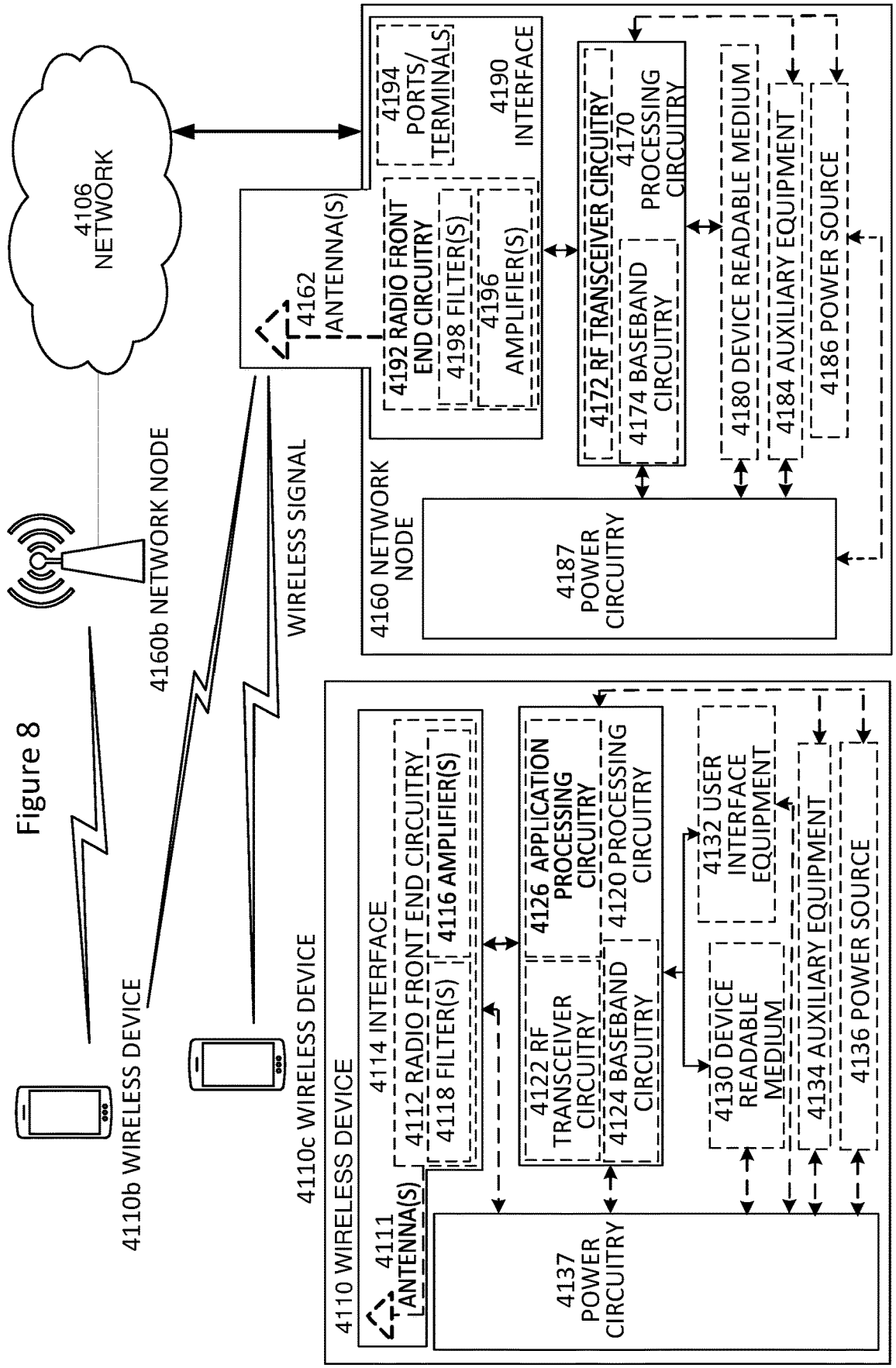
FIG. 8 is a block diagram of a wireless network in accordance with some embodiments.

FIG. 8 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 8 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 9:
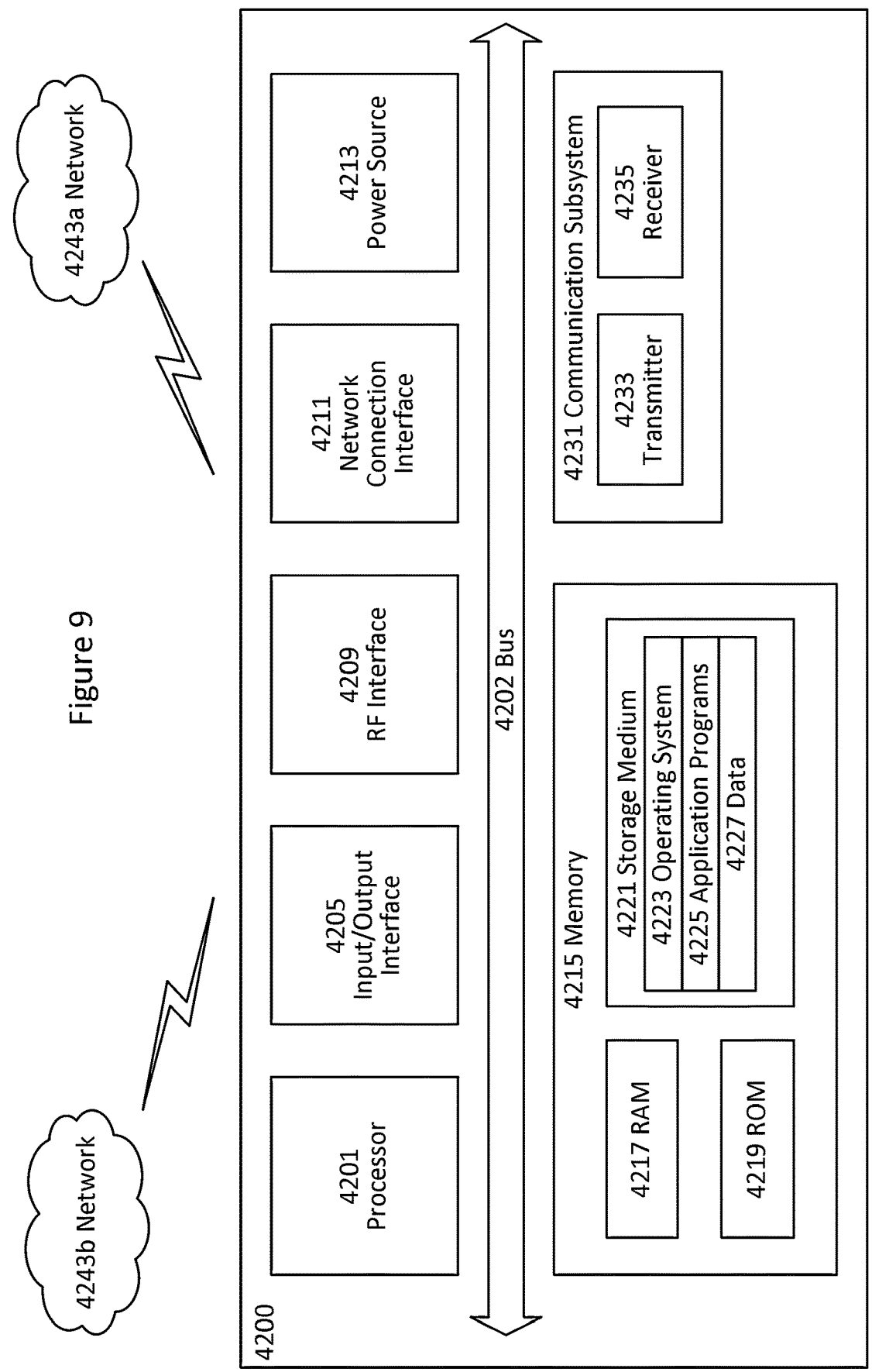
FIG. 9 is a block diagram of a user equipment in accordance with some embodiments

FIG. 9 illustrates a user Equipment in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 9, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 10:
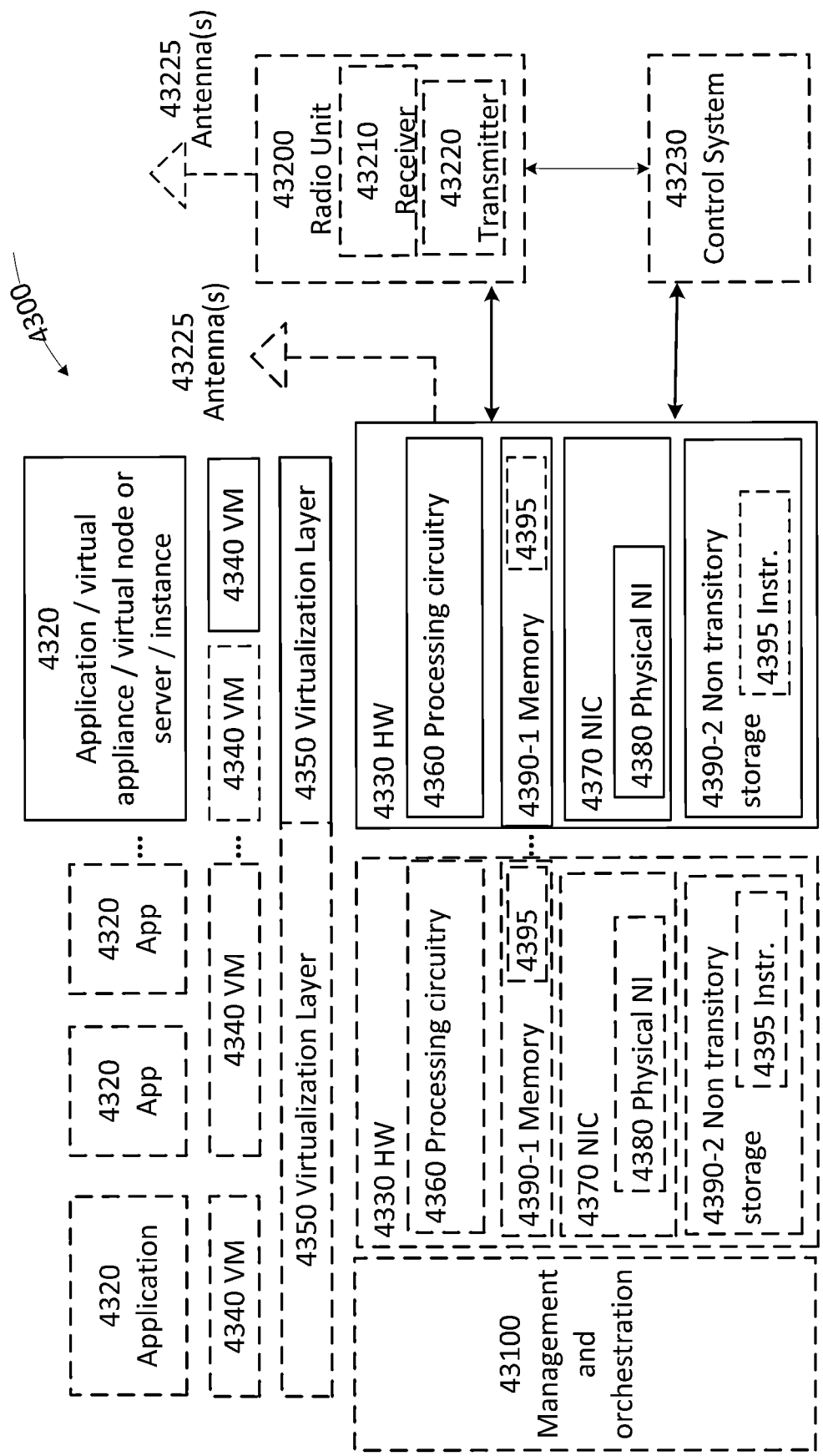
FIG. 10 is a block diagram of a virtualization environment in accordance with some embodiments.

FIG. 10 illustrates a virtualization environment in accordance with some embodiments.

FIG. 10 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 10, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 10.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 11:
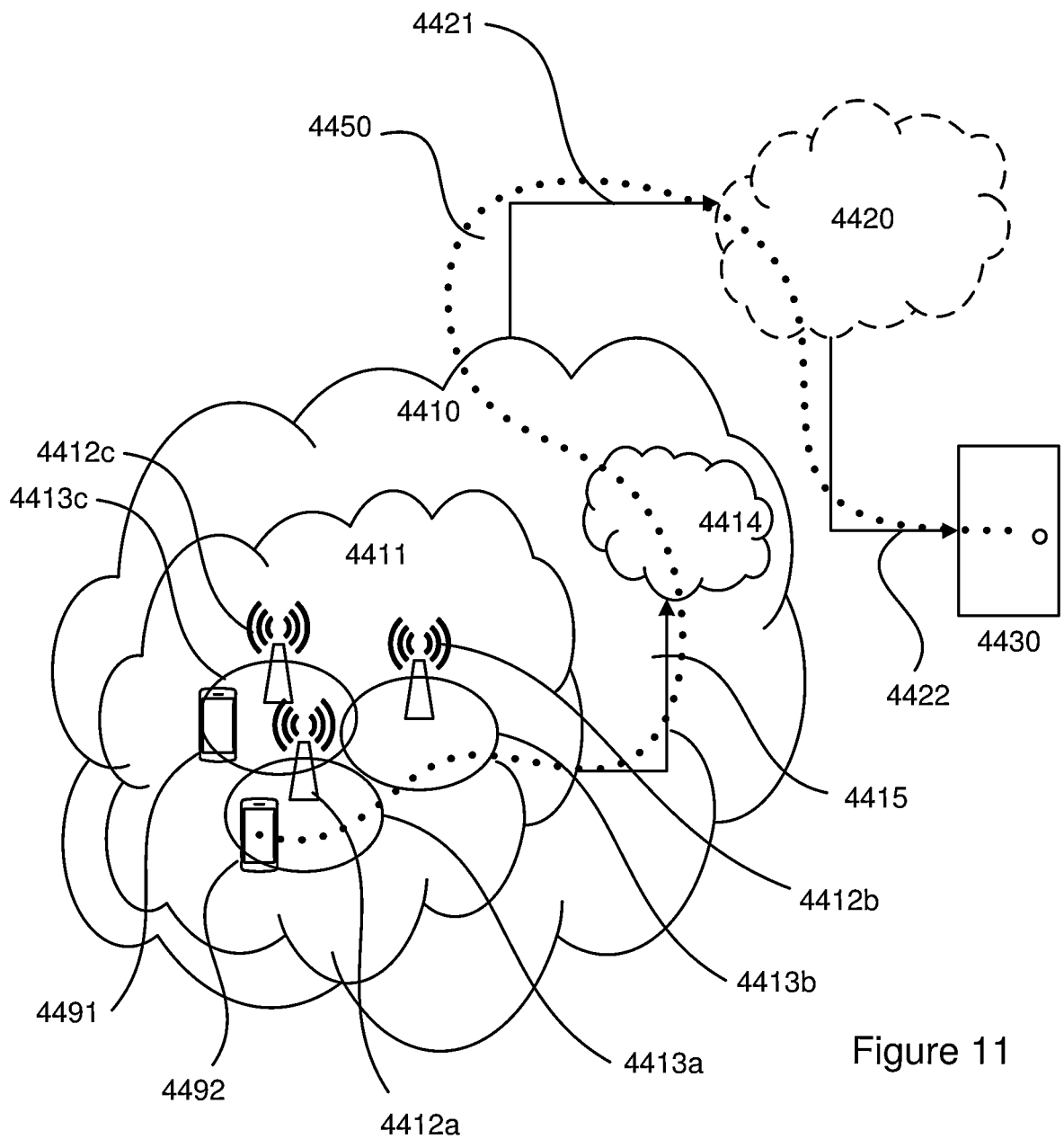
FIG. 11 is a block diagram of a telecommunication network connected via an intermediate network to a host computer in accordance with some embodiments.

FIG. 11 illustrates a telecommunication network connected via an intermediate network to a host computer in accordance with some embodiments.

With reference to FIG. 11, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 11 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 12:
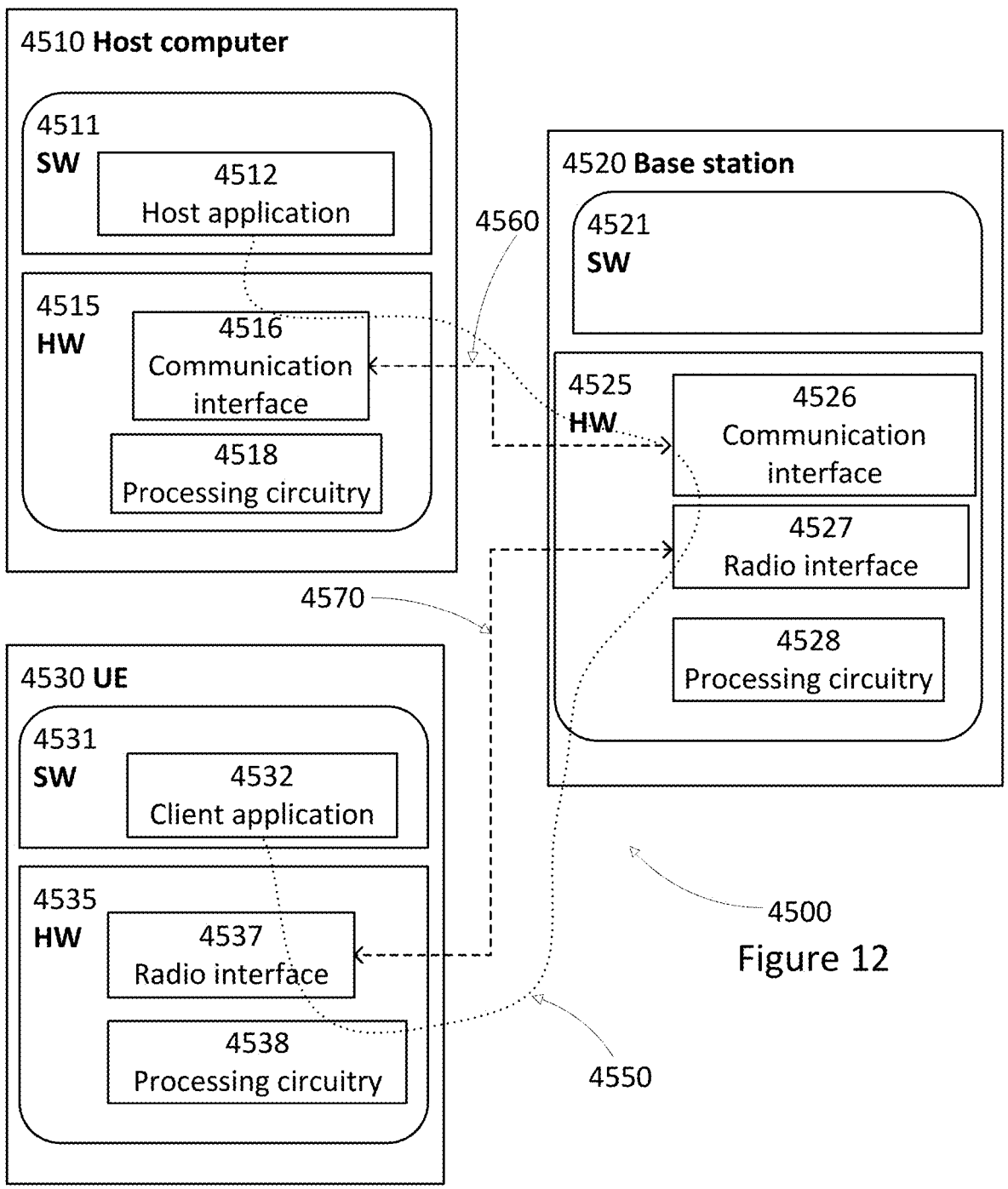
FIG. 12 is a block diagram of a host computer communicating via a base station with a user equipment over a partially wireless connection in accordance with some embodiments.

FIG. 12 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 12) served by base station 4520. Communication interface 4526 may be configured to facilitate connection 4560 to host computer 4510. Connection 4560 may be direct or it may pass through a core network (not shown in FIG. 12) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 12 may be similar or identical to host computer 4430, one of base stations 4412a, 4412b, 4412c and one of UEs 4491, 4492 of FIG. 11, respectively. This is to say, the inner workings of these entities may be as shown in FIG. 12 and independently, the surrounding network topology may be that of FIG. 11.

In FIG. 12, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 13:
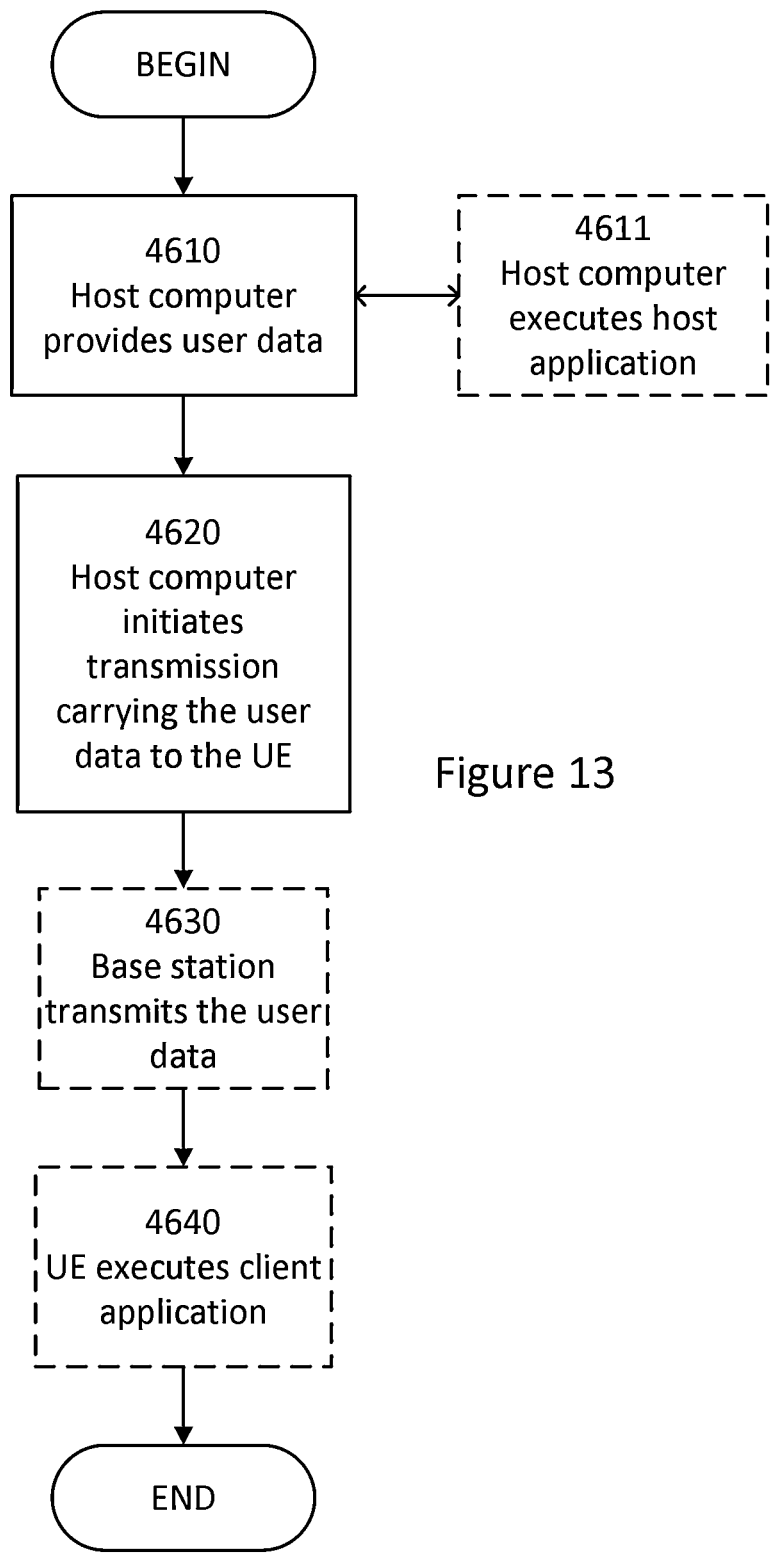
FIG. 13 is a block diagram of methods implemented in a communication system including a host computer, a base station and a user equipment in accordance with some embodiments.

FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 14:
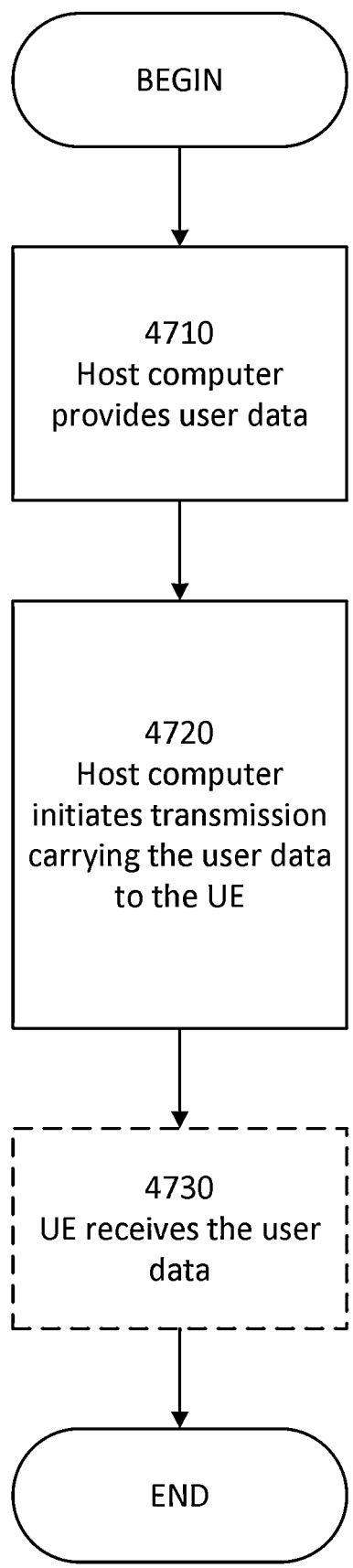
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 15:
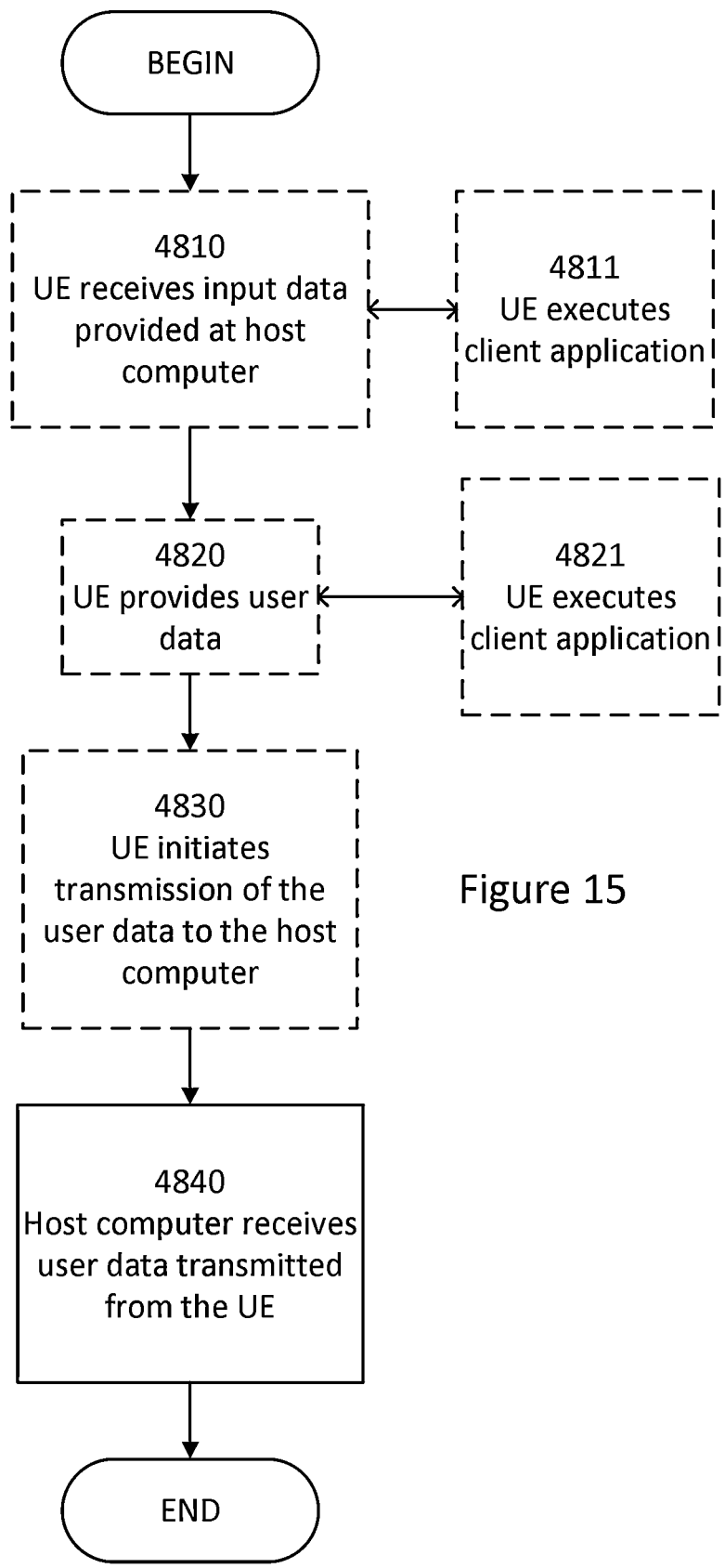
FIG. 15 is a block diagram of methods implemented in a communication system including a host computer, a base station and a user equipment in accordance with some embodiments.

FIG. 15 illustrates methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 16:
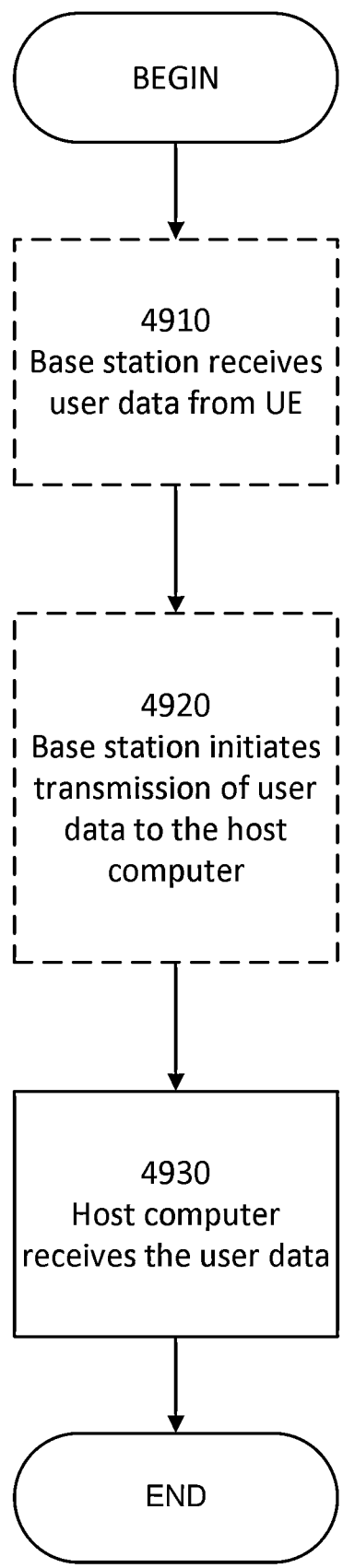
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a user equipment (UE) in a communication network, the method comprising:
receiving a downlink control indication (DCI) that schedules a plurality of transmission blocks (TBs); and
dynamically generating a Hybrid Automatic Repeat Request Round Trip Time (HARQ RTT) timer value as 7+I*N, in which N is a Physical Uplink Control Channel (PUCCH) repetition factor and I is the number of the TBs scheduled in the DCI.

2. The method of claim 1, further comprising determining the number of the TBs that are scheduled in the DCI.

3. The method of claim 1, wherein only valid UL subframes are counted.

4. The method of claim 3, wherein the valid UL subframes are configured by upper layers in fdd-UplinkSubframeBitmapBR.

5. The method of claim 1, wherein the HARQ RTT timer value is generated as 7+I*N+s, in which N is a Physical Uplink Control Channel (PUCCH) repetition factor, I is the number of the TBs scheduled in the DCI and s is a delay factor that provides timer alignment corresponding to machine type communication physical downlink control channel (MPDCCH) operations.

6. The method of claim 1, wherein the DCI comprises a first DCI, wherein the plurality of TBs comprises a first plurality of TBs, wherein the number of the TBs scheduled in the first DCI comprises a first number of the TBs, wherein the HARQ RTT timer value comprises a first HARQ RTT timer value, and wherein the method further comprises:
receiving a second DCI that schedules a second plurality of TBs; and
dynamically generating a second HARQ RTT timer value that is based on the second number of TBs scheduled in the second DCI and that is different from the first HARQ RTT timer value.

7. The method of claim 1, wherein the communication network comprises a narrow band internet of things network (NBIoT) or an enhanced Machine Type Communication (eMTC) network.

8. A user equipment (UE) comprising:
processing circuitry; and
memory coupled with the processing circuitry, wherein the memory includes instructions that when executed by the processing circuitry causes the user equipment to:
receive a downlink control indication (DCI) that schedules a plurality of transmission blocks (TBs); and
dynamically generate a Hybrid Automatic Repeat Request Round Trip Time (HARQ RTT) timer value as 7+I*N, in which N is a Physical Uplink Control Channel (PUCCH) repetition factor and I is the number of the TBs scheduled in the DCI.

9. The user equipment according to claim 8, the memory including instructions that when executed by the processing circuitry causes the user equipment to determine the number of the TBs that are scheduled in the DCI.

10. The user equipment of claim 8, wherein only valid UL subframes are counted.

11. The user equipment of claim 10, wherein the valid UL subframes are configured by upper layers in fdd-UplinkSubframeBitmapBR.

12. The user equipment according to claim 8, wherein the HARQ RTT timer value is generated as 7+I*N+s, in which N is a Physical Uplink Control Channel (PUCCH) repetition factor, I is the number of the TBs scheduled in the DCI and s is a delay factor that provides timer alignment corresponding to machine type communication physical downlink control channel (MPDCCH) operations.

13. The user equipment according to claim 8, wherein the DCI comprises a first DCI, wherein the plurality of TBs comprises a first plurality of TBs, wherein the number of the TBs scheduled in the first DCI comprises a first number of the TBs, wherein the HARQ RTT timer value comprises a first HARQ RTT timer value, and wherein the memory includes instructions that when executed by the processing circuitry causes the user equipment to:
receive a second DCI that schedules a second plurality of TBs; and
dynamically generate a second HARQ RTT timer value that is based on the second number of TBs scheduled in the second DCI and that is different from the first HARQ RTT timer value.

14. The user equipment according to claim 8, wherein the communication network comprises a narrow band internet of things network (NBIoT) or an enhanced Machine Type Communication (eMTC) network.

15. A method of operating a radio access network node (RAN) in a communication network, the method comprising:
sending, to a user equipment (UE), a downlink control indication (DCI) that schedules a plurality of transmission blocks (TBs), and that causes the user equipment to dynamically generate a Hybrid Automatic Repeat Request Round Trip Time (HARQ RTT) timer value as 7+I*N, in which N is a Physical Uplink Control Channel (PUCCH) repetition factor and I is the number of the TBs scheduled in the DCI.

16. The method of claim 15, wherein only valid UL subframes are counted.

17. The method of claim 16, wherein the valid UL subframes are configured by upper layers in fdd-UplinkSubframeBitmapBR.

18. The method of claim 15, wherein the HARQ RTT timer value is generated as 7+I*N+s, in which N is a Physical Uplink Control Channel (PUCCH) repetition factor, I is the number of the TBs scheduled in the DCI and s is a delay factor that provides timer alignment corresponding to machine type communication physical downlink control channel (MPDCCH) operations.

19. The method of claim 15, wherein the DCI comprises a first DCI,
wherein the plurality of TBs comprises a first plurality of TBs,
wherein the number of the TBs scheduled in the first DCI comprises a first number of the TBs, and
wherein the HARQ RTT timer value comprises a first HARQ RTT timer value, wherein the user equipment is further caused to:
receive a second DCI that schedules a second plurality of TBs; and
dynamically generate a second HARQ RTT timer value that is based on the second number of the TBs scheduled in the DCI and that is different from the first HARQ RTT timer value.

20. The method of claim 15, wherein the communication network comprises a narrow band internet of things network (NBIoT) or an enhanced Machine Type Communication (eMTC) network.

21. A radio access network (RAN) node, comprising:
processing circuitry; and
memory coupled with the processing circuitry, wherein the memory includes instructions that when executed by the processing circuitry causes the RAN node to send, to a user equipment (UE), a downlink control indication (DCI) that schedules a plurality of transmission blocks (TBs) and that causes the user equipment to dynamically generate a Hybrid Automatic Repeat Request Round Trip Time (HARQ RTT) timer value as 7+I*N, in which N is a Physical Uplink Control Channel (PUCCH) repetition factor and I is the number of the TBs scheduled in the DCI.

22. The radio access network (RAN) of claim 21, wherein only valid UL subframes are counted.

23. The radio access network (RAN) of claim 22, wherein the valid UL subframes are configured by upper layers in fdd-UplinkSubframeBitmapBR.

24. The radio access network (RAN) node of claim 21, wherein the HARQ RTT timer value is generated as 7+I*N+s, in which N is a Physical Uplink Control Channel (PUCCH) repetition factor, I is the number of the TBs scheduled in the DCI and s is a delay factor that provides timer alignment corresponding to machine type communication physical downlink control channel (MPDCCH) operations.

25. The radio access network (RAN) node of claim 21, wherein the DCI comprises a first DCI, wherein the plurality of TBs comprises a first plurality of TBs, wherein the number of the TBs scheduled in the first DCI comprises a first number of the TBs, wherein the HARQ RTT timer value comprises a first HARQ RTT timer value, and wherein the user equipment is further caused to:

receive a second DCI that schedules a second plurality of TBs; and dynamically generate a second HARQ RTT timer value that is based on the second number of the TBs scheduled in the DCI and that is different from the first HARQ RTT timer value.

26. The radio access network (RAN) node of claim 21, wherein the communication network comprises a narrow band internet of things network (NBIoT) or an enhanced Machine Type Communication (eMTC) network.

* * * * *